United States Patent
Montagna (10) Patent No.: US 12,253,138 B2
(45) Date of Patent: Mar. 18, 2025

(54) DAMPER ASSEMBLY

(71) Applicant: DRIV Automotive Inc., Lake Forest, IL (US)

(72) Inventor: Franky Montagna, Bilzen (BE)

( * ) Notice: Subject to any disclaimer, the term of this patent is extended or adjusted under 35 U.S.C. 154(b) by 375 days.

(21) Appl. No.: 17/838,848

(22) Filed: Jun. 13, 2022

(65) Prior Publication Data

US 2023/0400081 A1    Dec. 14, 2023

(51) Int. Cl.
*F16F 9/348* (2006.01)
*B60G 13/06* (2006.01)

(52) U.S. Cl.
CPC .......... *F16F 9/3481* (2013.01); *F16F 9/3487* (2013.01); *B60G 13/06* (2013.01); *F16F 2222/12* (2013.01)

(58) Field of Classification Search
CPC ........ F16F 9/3481; F16F 9/3487; F16F 9/348; F16F 9/3484; F16F 2222/12; B60G 13/06
See application file for complete search history.

(56) References Cited

U.S. PATENT DOCUMENTS

| | | |
|---|---|---|
| 5,152,379 A | 10/1992 | Sackett et al. |
| 5,785,160 A | 7/1998 | Grundei |
| 6,672,436 B1 | 1/2004 | Keil et al. |
| 8,069,964 B2 | 12/2011 | Deferme |
| 9,067,471 B2 | 6/2015 | Tuts et al. |
| 9,074,651 B2 | 7/2015 | Bismans et al. |
| 9,200,693 B2 * | 12/2015 | Lim ...................... F16F 9/3485 |
| 9,249,854 B2 * | 2/2016 | Kim ........................ F16F 9/348 |
| 9,410,595 B2 * | 8/2016 | Yamada ................. F16F 9/3481 |
| 10,113,604 B2 * | 10/2018 | Ericksen ..................... F16F 9/19 |
| 10,443,673 B2 * | 10/2019 | Förster .................. F16F 9/3485 |
| 12,018,732 B2 * | 6/2024 | Kawate .................... F16F 9/185 |
| 2009/0057080 A1* | 3/2009 | Deferme ............... F16F 9/3488 188/313 |
| 2014/0060315 A1* | 3/2014 | Mori ....................... F16F 9/348 91/418 |
| 2015/0041269 A1* | 2/2015 | Lim ...................... F16F 9/3485 188/322.15 |

(Continued)

FOREIGN PATENT DOCUMENTS

| | | |
|---|---|---|
| FR | 2883612 A1 | 9/2006 |
| KR | 20220068801 | 5/2022 |

OTHER PUBLICATIONS

Extended European Search Report dated Nov. 7, 2023 filed in related application EP23175268.4 (7 pages).

*Primary Examiner* — Thomas W Irvin (57) ABSTRACT

A damper assembly includes a pressure tube forming a chamber, a piston assembly disposed in the chamber and dividing the chamber into two subchambers, and a piston rod fixed to the piston assembly. The piston assembly includes a body having an inner bore extending axially through the body. The piston assembly includes a blowoff disc contacting the body at the inner bore and having a throughhole aligned with the inner bore. The piston rod extends through and concentrically contacts the inner bore and the throughhole. The body has a groove extending axially along a length of the inner bore. The groove and the piston rod form a passageway permitting fluid to travel across the body. The blowoff disc has a notch extending from the throughhole and arranged to permit fluid from the passageway to pass across the blowoff disc.

18 Claims, 11 Drawing Sheets

(56) References Cited

U.S. PATENT DOCUMENTS

| | | | |
|---|---|---|---|
| 2015/0114774 A1* | 4/2015 | Kim | F16F 9/3485 |
| | | | 188/322.15 |
| 2015/0192184 A1 | 7/2015 | Yamada | |
| 2021/0364058 A1 | 11/2021 | Kawate et al. | |
| 2024/0019012 A1* | 1/2024 | Kim | F16K 31/363 |
| 2024/0035541 A1* | 2/2024 | Cho | F16F 9/19 |

* cited by examiner

DAMPER ASSEMBLY

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle.

The dampers control movement of the wheels by limiting fluid flow past a piston of the damper. The fluid flows past the piston, e.g., via passages of the piston, when the damper is moved toward a compressed or extended position. The passages may have a fixed opening size. Resistance to movement is provided by the passages limiting an amount of fluid that flows therethrough. The resistance to movement may increase exponentially as movement speed is increased.

SUMMARY

A damper assembly includes a pressure tube forming a chamber and defining an axis, a piston assembly disposed in the chamber and dividing the chamber into two subchambers, and a piston rod elongated along the axis and fixed to the piston assembly. The piston assembly includes a body having an inner bore extending axially through the body from a first end to a second end. The piston assembly includes a blowoff disc contacting the body at the first end of the inner bore and has a throughhole aligned with the inner bore. The piston rod extends through and concentrically contacting the inner bore and extends through and concentrically contacting the throughhole. One of the body or the piston rod has a groove extending axially along the inner bore from the first end to the second end. The body and the piston rod form a passageway through the groove permitting fluid to travel between the first end and the second end. The blowoff disc has a notch extending from the throughhole and is arranged to permit fluid from the passageway to pass across the blowoff disc.

In an example, the body may include a lip at the first end of the inner bore permitting fluid to travel between the passageway and the notch. The lip may extend completely around the first end of the inner bore.

In an example, the body may have a plurality of grooves including the groove, the grooves may extend axially along the inner bore from the first end to the second end, and the grooves may be circumferentially spaced from each other.

In an example, the blowoff disc may have a plurality of notches including the notch, the notches may extend from the throughhole, and the notches may be circumferentially spaced from each other.

In an example, the body may include a throughbore extending through the body and permitting fluid to flow between the subchambers, and the throughbore may be spaced from the inner bore. A cross-sectional area of the throughbore may be greater than a cross-sectional area of the notch. The body may include a plurality of throughbores including the throughbore, the throughbores may each permit fluid to flow between the subchambers, the throughbores may be spaced from the inner bore, and the throughbores may be spaced from each other.

In an example, the damper assembly may further include a plurality of valve discs stacked on the blowoff disc such that the blowoff disc is axially between the valve discs and the body. The damper assembly may further include a fulcrum disc abutting the valve discs such that the valve discs are axially between the fulcrum disc and the body. An outer diameter of the fulcrum disc may be smaller than any of the outer diameters of the valve discs. The piston rod may extend through the valve discs and the fulcrum disc. The damper assembly may further include a preload ring positioned axially between the valve discs and the blowoff disc. An inner diameter of the preload ring may be smaller than an outer diameter of a closest disc of the valve discs, and the inner diameter of the preload ring may be smaller than an outer diameter of the blowoff disc. An outer diameter of the preload ring may be at least as great as an outer diameter of a closest disc of the valve discs.

In an example, the pressure tube may be cylindrical.

In an example, the body may have a first side facing axially toward the blowoff disc, and the first side may include a center axial projection extending concentrically around the inner bore and contacting the blowoff disc. The first side may include a plurality of peripheral axial projections radially spaced from the center axial projection, and the peripheral axial projections may contact the blowoff disc. The blowoff disc may include a cutout positioned radially outside the center axial projection and radially inside the peripheral axial projections. The notch may extend radially outward past an outer diameter of the center axial projection.

DETAILED DESCRIPTION

With reference to the Figures, wherein like numerals indicate like parts throughout the several views, a damper assembly 102 for a vehicle 100 includes a pressure tube 104 forming a chamber 106 and defining an axis A, a piston assembly 110 disposed in the chamber 106 and dividing the chamber 106 into two subchambers 144, 146, and a piston rod 114 elongated along the axis A and fixed to the piston assembly 110. The piston assembly 110 includes a body 116 having an inner bore 118 extending axially through the body 116 from a first end 120 to a second end 122. The piston assembly 110 includes a blowoff disc 124 contacting the body 116 at the first end 120 of the inner bore 118 and having a throughhole 126 aligned with the inner bore 118. The piston rod 114 extends through and concentrically contacts the inner bore 118 and extends through and concentrically contacts the throughhole 126. The body 116 has a groove 128 extending axially along the inner bore 118 from the first end 120 to the second end 122. The groove 128 and the piston rod 114 form a passageway 130 permitting oil to travel between the first end 120 and the second end 122. The blowoff disc 124 has a notch 132 extending from the throughhole 126 and arranged to permit oil from the passageway 130 to pass across the blowoff disc 124.

A damping force provided by the damper assembly 102 can depend on the rate of fluid moving between the subchambers 144, 146 as the piston assembly 110 moves. As the piston assembly 110 moves, one of the subchambers 144, 146 increases in volume and the other subchamber 144, 146 decreases in volume, leading the fluid to pass from the decreasing subchamber 144, 146 to the increasing subchamber 144, 146. The passageway 130 and the notch 132 provide one way for the fluid to move between the two subchambers 144, 146 as the piston assembly 110 slides through the chamber 106 of the cylinder. One benefit of the damper assembly 102 may be easier assembly because the groove 128 and the piston rod 114 can form the passageway 130 regardless of the orientation of the body 116 relative to the piston rod 114. Another benefit is fine control over the rate of the fluid moving between the subchambers 144, 146. During design, the rate of fluid transfer can be controlled by adjusting the cross-sectional area of the groove 128 and/or by changing a number of the grooves 128.

Figure 1:
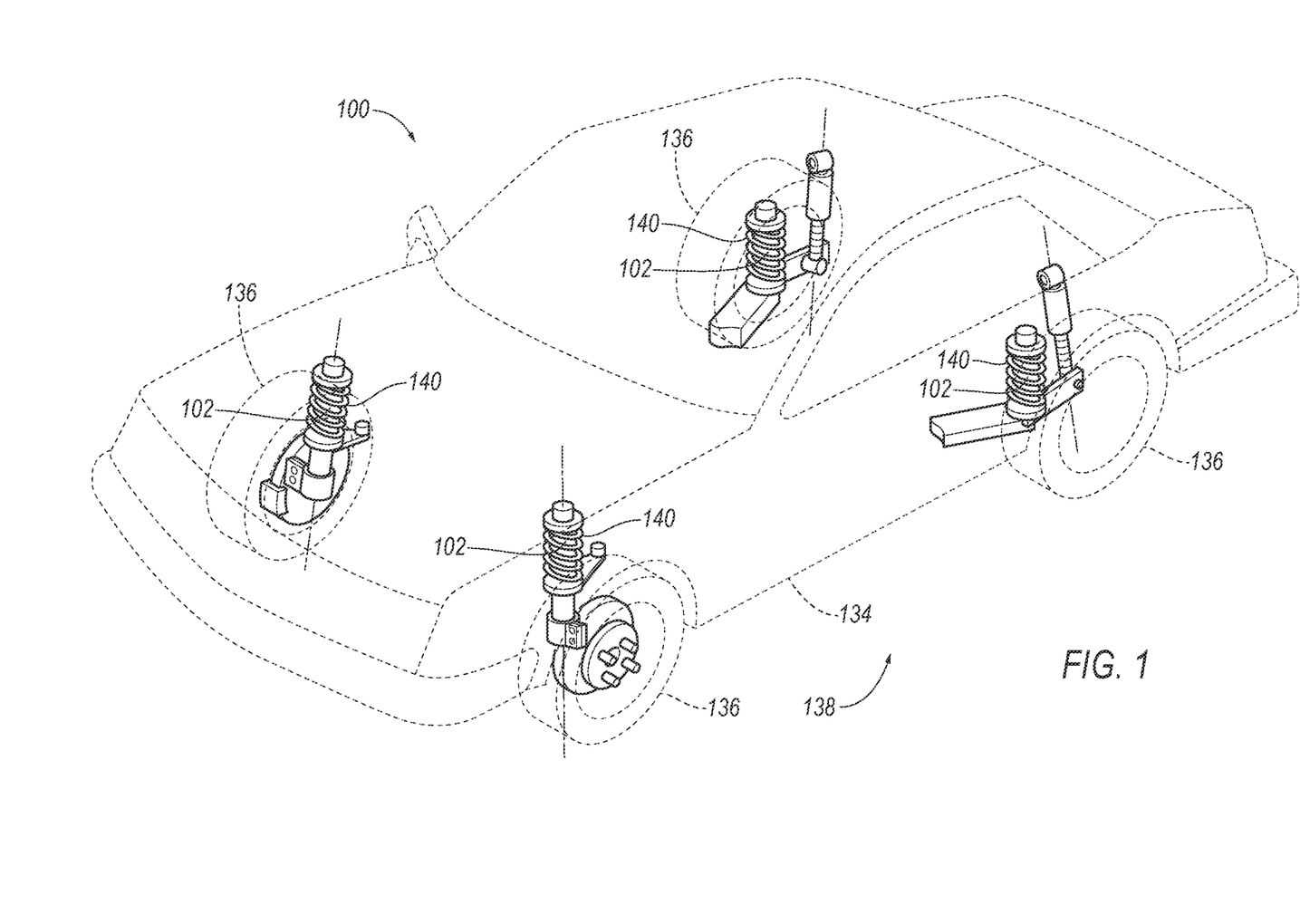
FIG. 1 is a perspective view of a vehicle having a plurality of damper assemblies.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a frame 134. The vehicle 100 may be of a unibody construction, in which the frame 134 and a body of the vehicle 100 are a single component. The vehicle 100 may, alternatively, be of a body-on-frame construction, in which the frame 134 supports a body that is a separate component from the frame 134. The frame 134 and body may be formed of any suitable material, for example, steel, aluminum, etc.

The vehicle 100 includes wheels 136 that control motion of the vehicle 100 relative to ground supporting the vehicle 100, e.g., acceleration, declaration, turning, etc. Vertical movement of the wheels 136 relative to the frame 134 affects an amount of traction between the wheels 136 and the ground and an amount of vertical acceleration experienced by occupants of the vehicle 100 when the vehicle 100 travels over bumps and the like, e.g., the ride feel experienced by the occupants.

The vehicle 100 includes a suspension system 138. The suspension system 138 is coupled to the frame 134 and to each wheel 136. The suspension system 138 absorbs and dampens shocks and vibrations from the wheels 136 to the frame 134. For each wheel 136, the suspension system 138 may include a coil spring 140 and the damper assembly 102. The damper assembly 102 may extend through the coil springs 140. One end of the damper assembly 102 and the coil spring 140 may be connected to and move with the wheel 136, and the other end of the damper assembly 102 and the coil spring 140 may be connected to and move with the frame 134.

The suspension system 138 is arranged so that an upward motion of the wheel 136, such as when the tire hits a bump while the vehicle 100 is in motion, compresses the coil spring 140 and the damper assembly 102. The coil spring 140 may exert a force that is a function, e.g., a linear relation, of a difference between the current length of the coil spring 140 and a relaxed length of the coil spring 140. The damper assembly 102 may exert a force that is a function of a speed of compression or extension of the damper assembly 102.

Figure 2:
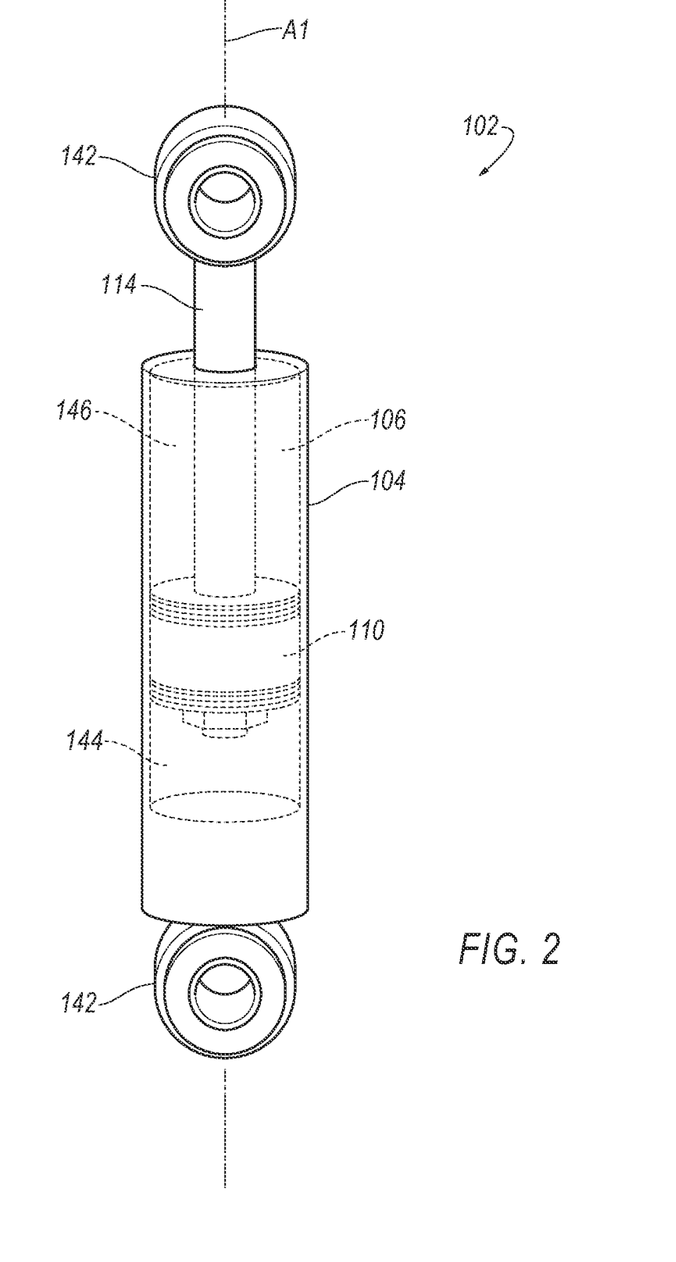
FIG. 2 is a perspective view of one of the damper assemblies.

With reference to FIG. 2, the damper assembly 102 is movable from a compressed position to an extended position, and vice versa. A distance between mounting points 142 of the damper assembly 102 is less in the compressed position than in the extended position. The coil springs 140 or the like may urge the damper assemblies 102 toward the extended position. Force applied to the wheels 136 of the vehicle 100, e.g., from bumps, potholes, etc., may urge to damper assemblies 102 toward the compressed positions.

Each damper assembly 102 controls movement of the respective wheels 136 by limiting fluid flow into, out of, and/or between the subchambers 144, 146, e.g., between a compression subchamber 144 and a rebound subchamber 146. Fluid movement is caused by a movement of the piston assembly 110 within the pressure tube 104 of the damper assembly 102, e.g., when the damper assembly 102 is moved toward the compressed position or the extended position.

The damper assembly 102 defines the axis A. The axis A extends between the mounting points 142 of the damper assembly 102. The damper assembly 102 may be elongated along the axis A. The terms "axially," "radially," and "circumferentially" used herein are relative to the axis A defined by the damper assembly 102.

The pressure tube 104 defines the chamber 106. For example, the pressure tube 104 may be hollow and tubular, e.g., cylindrical, enclosing the chamber 106 therein. The axis A may be defined by the cylindrical shape of the pressure tube 104. The chamber 106 is filled with fluid, e.g., an incompressible hydraulic fluid such as oil. Movement of the damper assembly 102, e.g., to the extended or compressed position, may increase and/or decrease fluid pressure in the pressure tube 104, e.g., in the compression subchamber 144 and the rebound subchamber 146. The pressure tube 104 may be elongated along the axis A of the damper assembly 102. The pressure tube 104 may be metal, or any suitable material.

The damper assembly 102 includes the piston rod 114 extending away from, and movable relative to, the pressure tube 104. The piston rod 114 may be elongated along the axis A of the damper assembly 102. The piston rod 114 is fixed to the piston assembly 110. The piston rod 114 is moved relative to the pressure tube 104 together with the piston assembly 110 when the damper assembly 102 is moved toward the compressed position or the extended position. The piston rod 114 may extend from within the chamber 106 of the pressure tube 104 to outside the chamber 106, e.g., from the piston assembly 110 and through the rebound subchamber 146.

The piston assembly 110 divides the chamber 106 of the pressure tube 104 into the compression subchamber 144 and the rebound subchamber 146, i.e., with the compression subchamber 144 on one side 158, 160 of the piston assembly 110 and the rebound subchamber 146 on the opposite side 158, 160 of the piston assembly 110 along the axis A. An outer circumferential surface 148 of the piston assembly 110, e.g., of the body 116, may be sealed to an inner surface of the pressure tube 104. The piston assembly 110 is slidable within the chamber 106 of the pressure tube 104 along the axis A. Sliding the piston assembly 110 along the axis A varies volumes of the compression subchamber 144 and the rebound subchamber 146. For example, a volume of the compression subchamber 144 may decrease, and a volume of the rebound subchamber 146 may increase, when the damper assembly 102 is moved toward the compressed position. As another example, the volume of the rebound subchamber 146 may decrease, and the volume of the compression subchamber 144 may increase, when the damper assembly 102 is moved toward the extended position. The piston assembly 110 is connected to the piston rod 114, i.e., such that the piston assembly 110 and the piston rod 114 move generally in unison. The piston assembly 110 may be fixed to the piston rod 114, e.g., via a fastener 150 and/or other suitable structure such as a weld, friction fit, etc. The piston assembly 110 may be metal, plastic, or any suitable material.

Figure 3A:
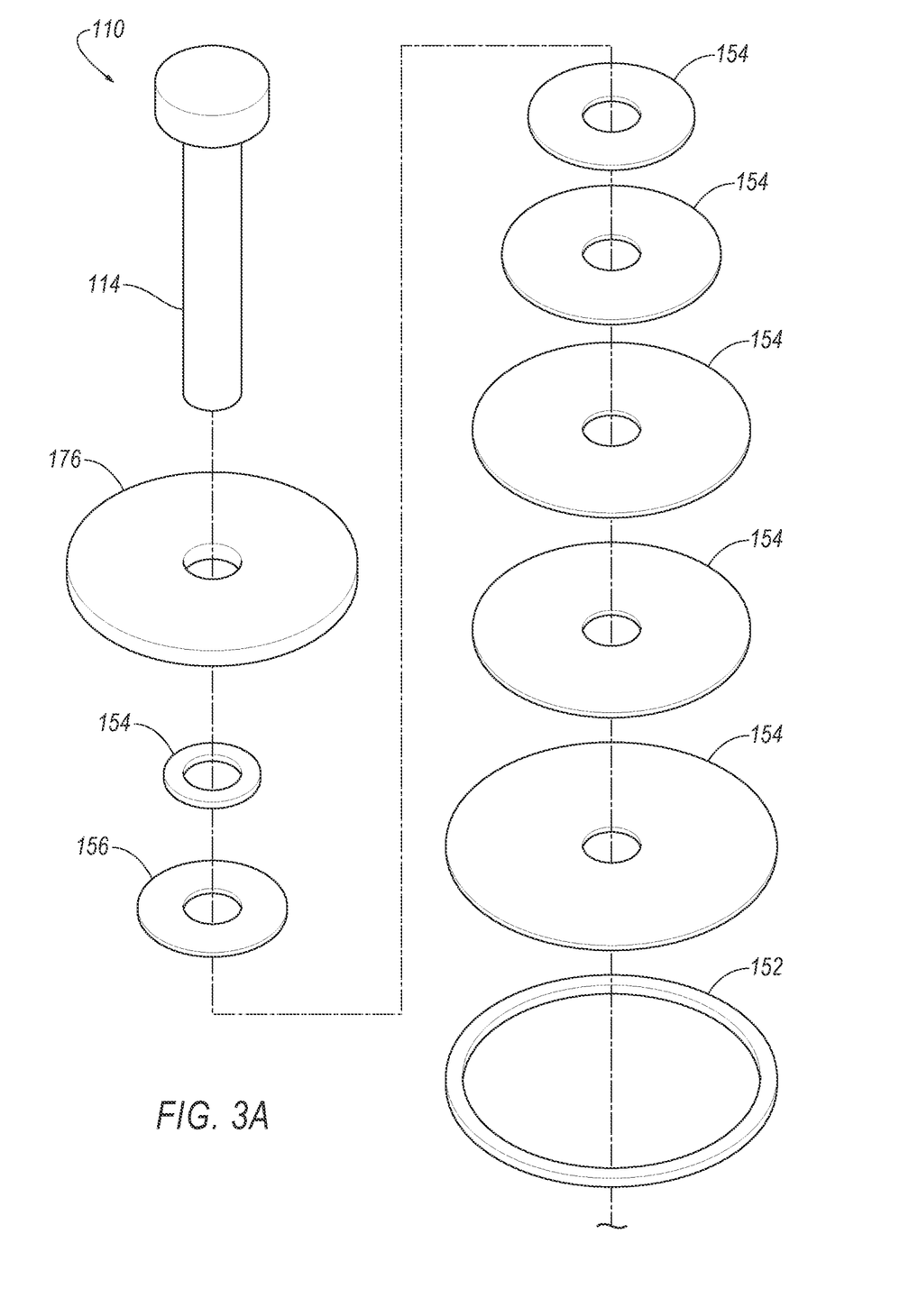
FIGS. 3A-C are collectively an exploded view of components of a piston assembly of the damper assembly.
Figure 3B:
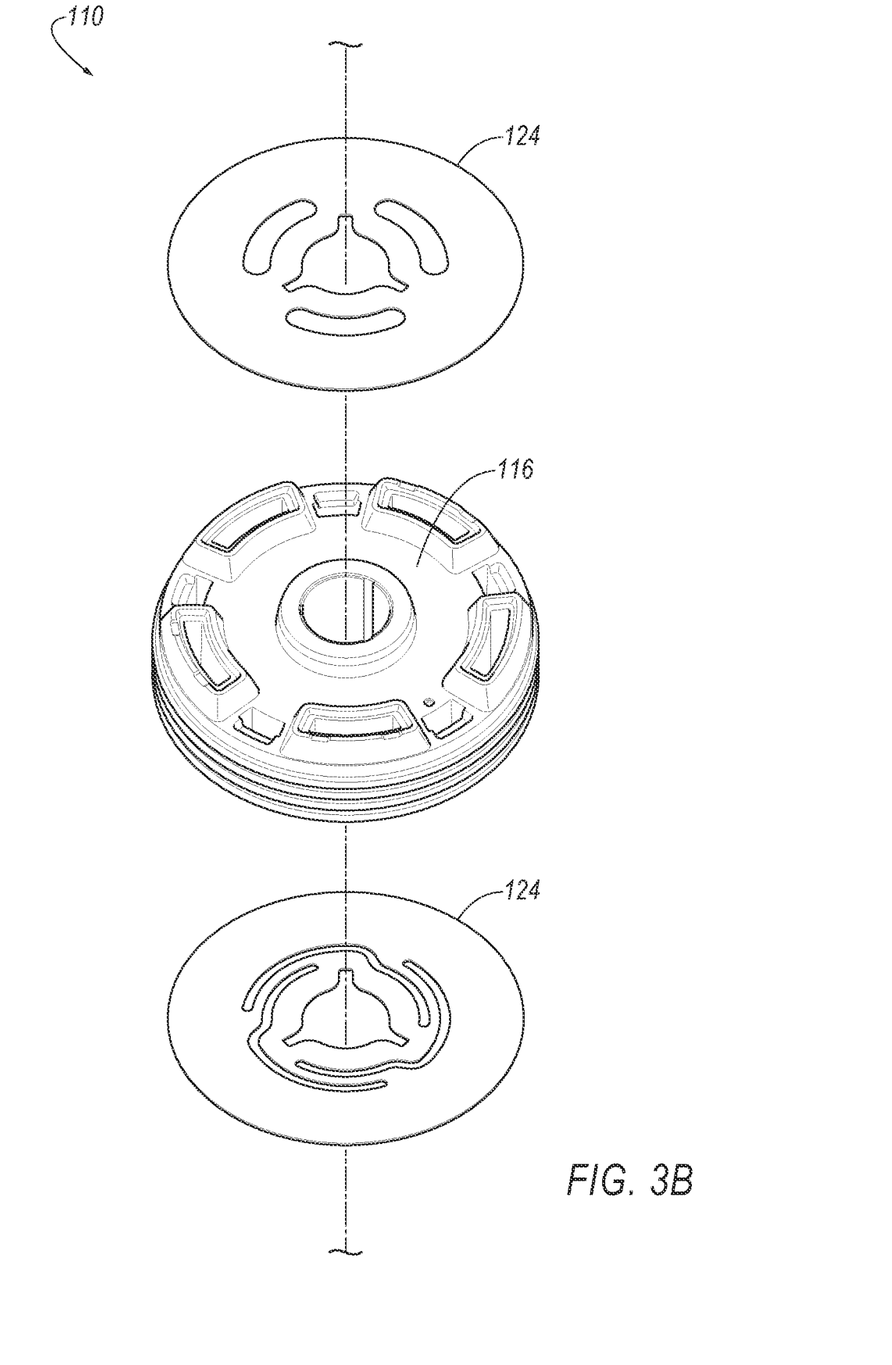
Figure 3C:
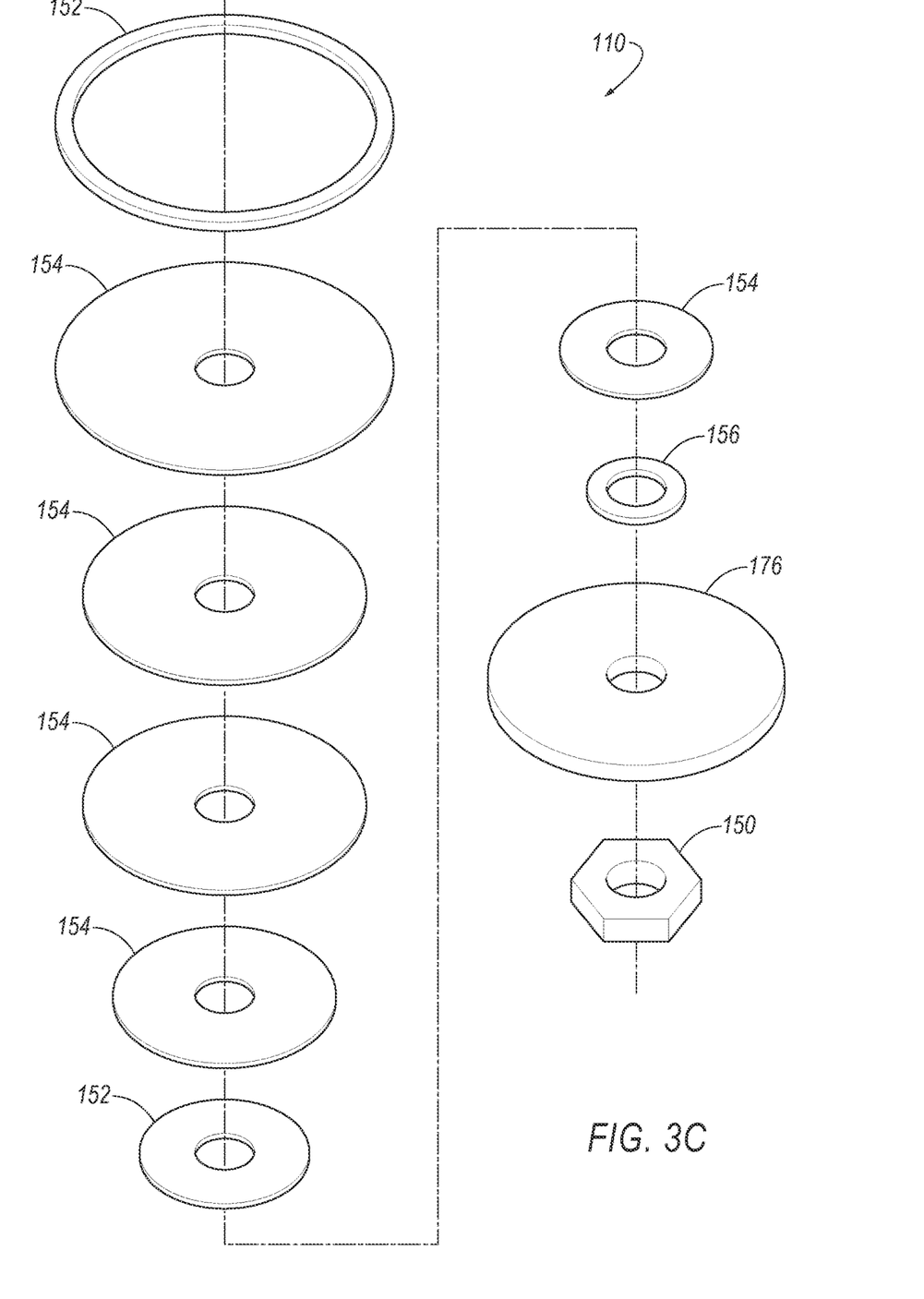

With reference to FIGS. 3A-C, the piston assembly 110 includes the body 116 and at least one blowoff disc 124. For example, the piston assembly 110 may include the body 116 and one blowoff disc 124 on each side 158, 160 of the body 116. The piston assembly 110 may further include a preload ring 152, a plurality of valve discs 154, a fulcrum disc 156, a preload spacer 176, and the fastener 150 on each side 158, 160 of the body 116, e.g., stacked in that order starting from the body 116. The piston rod 114 may extend through and concentrically contacting the inner bore 118 of the body 116 and may extend through and concentrically contacting the throughhole 126 of the blowoff disc 124. The piston rod 114 may further extend through the valve discs 154, the fulcrum discs 156, the preload spacers 176, and the fasteners 150. The valve discs 154, the fulcrum discs 156, and the preload spacers 176 may be radially symmetric and centered on the axis A.

Figure 4:
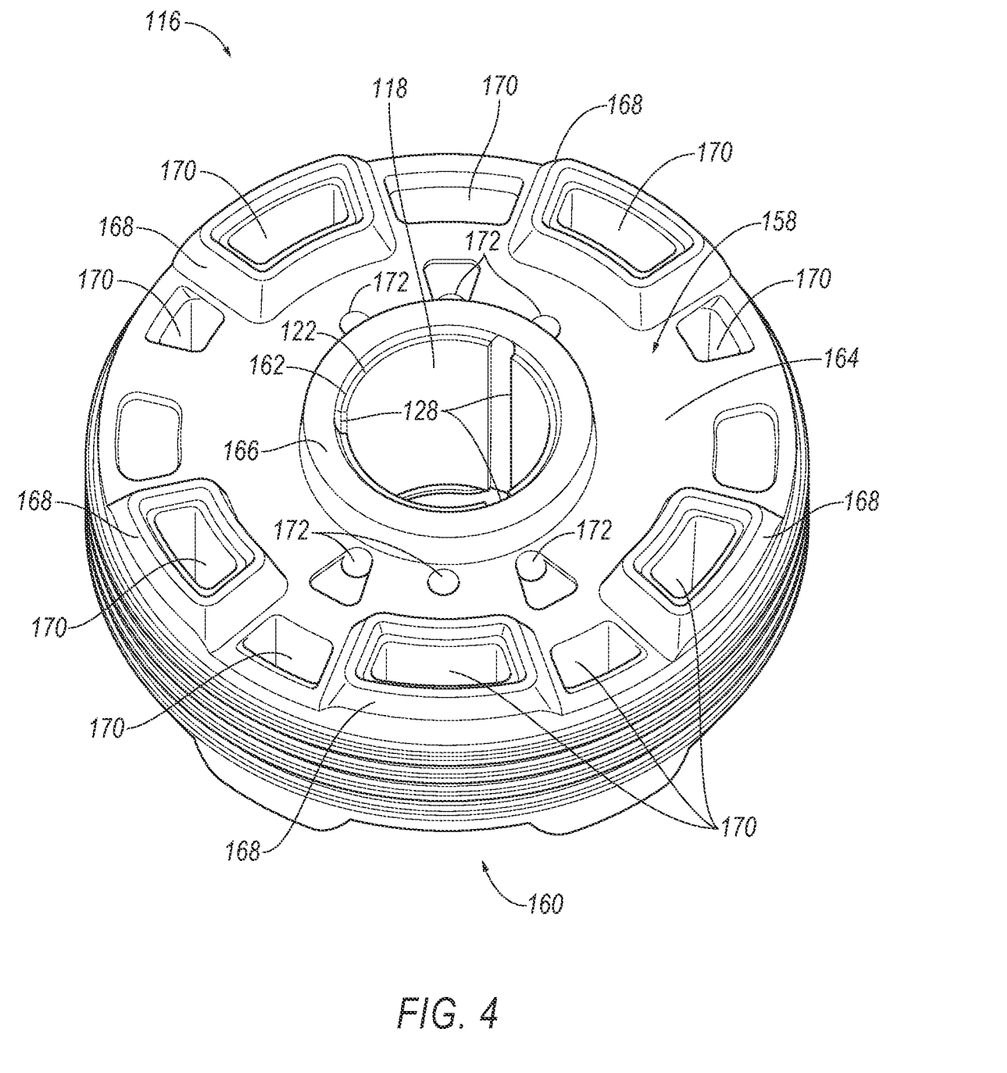
FIG. 4 is a perspective view of a body of the piston assembly.
Figure 5:
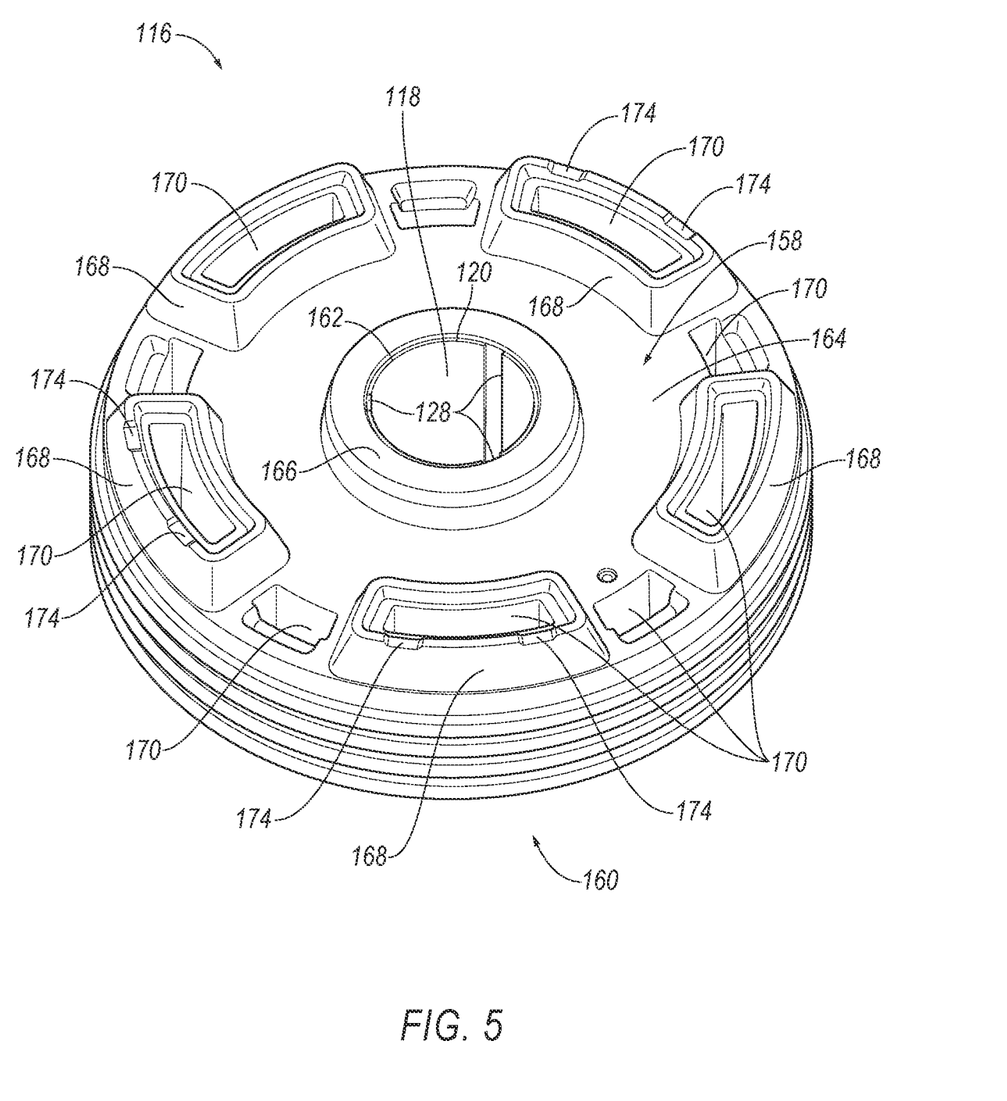
FIG. 5 is a perspective view of an alternative body of the piston assembly.

With reference to FIGS. 4-5, the piston assembly 110 includes the body 116. The body 116 can have the general shape of a squat cylinder, with an axial thickness less than the diameter but significantly greater than the thicknesses of any of the discs 124, 154, 156. The body 116 may include the inner bore 118, the outer circumferential surface 148, a first side 158, and a second side 160. The first side 158 and the second side 160 may each extend radially outward from the inner bore 118 to the outer circumferential surface 148. The first side 158 and the second side 160 can be opposite each other along the axis A. The first side 158 and the second side 160 can face axially toward respective blowoff discs 124, as shown in FIGS. 3A-C. The first side 158 may face toward the rebound subchamber 146, and the second side 160 may face toward the compression subchamber 144.

The inner bore 118 extends axially through the body 116 from the first end 120 to the second end 122. The first end 120 can be an exit from the inner bore 118 at the first side 158 of the body 116, and the second end 122 can be an exit from the inner bore 118 at the second side 160 of the body 116. The inner bore 118 can have a constant cross-sectional shape from the first end 120 to the second end 122. For example, the inner bore 118 can have a cylindrical shape with a constant diameter from the first end 120 to the second end 122. The inner bore 118 can have a diameter approximately equal to a diameter of the piston rod 114 such that fluid is blocked from flowing between the inner bore 118 and the piston rod 114.

The body 116 has at least one groove 128, e.g., a plurality of grooves 128, extending axially along the inner bore 118 from the first end 120 to the second end 122. For example, each groove 128 can be a channel having a depth extending radially outward from the inner bore 118. Alternatively, the piston rod 114 may include the grooves 128, in which case each groove 128 can be a channel having a depth extending radially inward from an outer surface of the piston rod 114. In either case, the grooves 128 may be elongated parallel to the axis A. In the case of multiple grooves 128, the grooves 128 are circumferentially spaced from each other. Each groove 128 can have a constant cross-sectional shape from the first end 120 to the second end 122 and may terminate at the first end 120 and at the second end 122. The body 116 and the piston rod 114 form a passageway 130 through each groove 128 permitting fluid to travel between the first end 120 and the second end 122, i.e., from the first end 120 to the second end 122 or vice versa.

The body 116 may include lips 162 at the first end 120 and at the second end 122 of the inner bore 118, e.g., one lip 162 at the first end 120 and one lip 162 at the second end 122. Each lip 162 can extend completely around the first end 120 or second end 122 of the inner bore 118, e.g., form a circle centered on the axis A. The lip 162 can have a width extending radially outward from the inner bore 118, i.e., having a greater diameter than the inner bore 118. Each lip 162 can have a constant cross-section projected circumferentially around the first end 120 or second end 122. Each lip 162 permits fluid to travel between the passageways 130 formed by the grooves 128 and the notches 132 of the blowoff disc 124. Each lip 162 can form a passageway with the piston rod 114 and the blowoff disc 124. Fluid exiting the groove 128 can then travel circumferentially around the piston rod 114 until the fluid reaches one of the notches 132. Because the lip 162 extends completely around the first end 120 or the second end 122 of the inner bore 118, the notches 132 can be located at any circumferential position relative to the grooves 128.

The first side 158 and the second side 160 may each include a base surface 164 and features 166, 168 extending axially from the base surface 164 toward the blowoff disc 124 located adjacent to that side 158, 160 of the body 116. The base surface 164 may define a plane perpendicular to the axis A. For example, the first side 158 and the second side 160 may each include a center axial projection 166 extending concentrically around the inner bore 118. The center axial projection 166 can have a height extending axially from the base surface 164 and a width extending radially outward from the inner bore 118. The height and/or the width can be constant around the inner bore 118. The lip 162 can be located in the center axial projection 166. The center axial projections 166 may contact the respective blowoff discs 124, e.g., by having the height be at least as great as the height of any other feature 166, 168 extending from the respective base surface 164.

The first side 158 and the second side 160 may each include a plurality of peripheral axial projections 168 radially spaced from the respective center axial projection 166. The peripheral axial projections 168 may be circumferentially spaced from each other on each side 158, 160 of the body 116. The peripheral axial projections 168 may border the outer circumferential surface 148. The peripheral axial projections 168 may contact the respective blowoff discs 124 when the blowoff disc 124 is in a relaxed position, e.g., by having a height equal to the height of the respective center axial projection 166.

The body 116 includes one or more projection passages 170. Each projection passage 170 may extend from one of the peripheral axial projections 168 on one side 158, 160 of the body 116 to the base surface 164 on the other side 158, 160 of the body 116, i.e., from one of the peripheral axial projections 168 on the first side 158 to the base surface 164 on the second side 160 or vice versa. The projection passages 170 provide fluid communication between the compression subchamber 144 and the rebound subchamber 146 of the pressure tube 104, i.e., such that fluid may flow from the compression subchamber 144 to the rebound subchamber 146 or vice versa.

With reference to FIG. 4, the body 116 includes one or more throughbores 172 extending through the body 116 and permitting fluid to flow between the subchambers 144, 146. The throughbores 172 are radially spaced from the inner bore 118. The throughbores 172 may be circumferentially and/or radially spaced from each other and/or from the projection passages 170. The throughbores 172 provide fluid communication between the compression subchamber 144 and the rebound subchamber 146 of the pressure tube 104, i.e., such that fluid may flow from the compression subchamber 144 to the rebound subchamber 146 or vice versa. Each throughbore 172 may have a greater cross-sectional area than each notch 132. During design, modifying the number of throughbores 172 and cross-sectional area of the throughbores 172 can provide a large range of potential flowrates across the body 116. The combination of the grooves 128 with the throughbores 172 can provide fine control of the flowrate over a wide range of flowrates.

With reference to FIG. 5, the peripheral axial projections 168 may include indentations 174 permitting fluid from the projection passages 170 to pass outside the peripheral axial projections 168 under the height of the peripheral axial projections 168. Therefore, fluid can flow through the indentations 174 even if the blowoff disc 124 is abutting the peripheral axial projections 168. The size of the indentations 174 can be used to tune the flow rate across the piston assembly 110.

Figure 6:
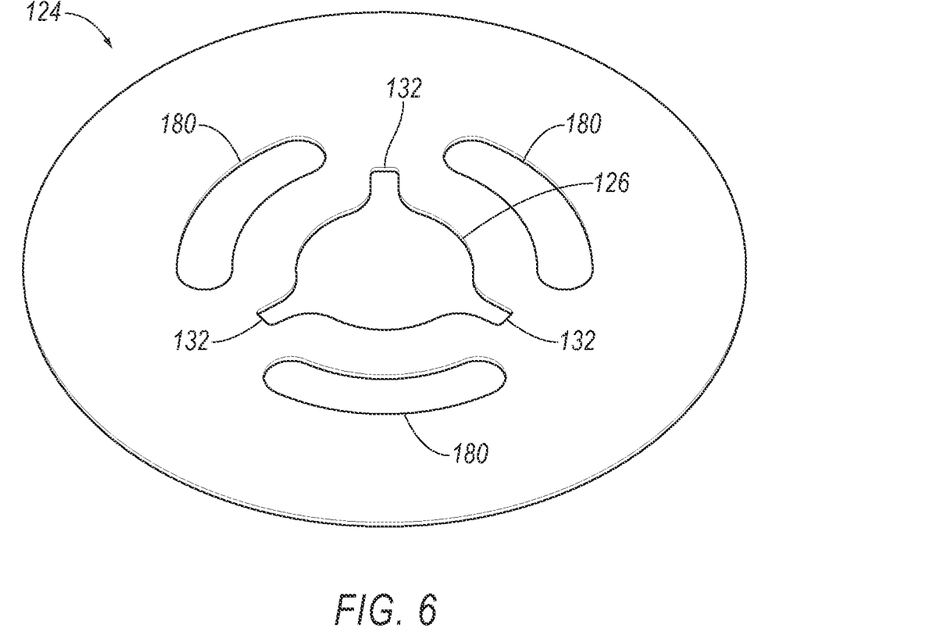
FIG. 6 is a perspective view of a blowoff disc of the piston assembly.
Figure 7:
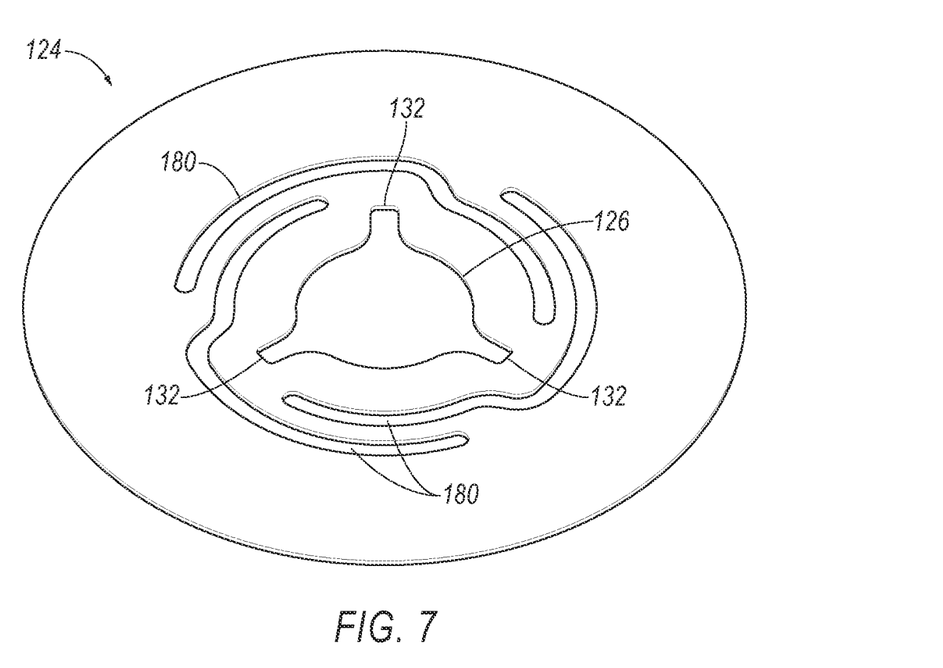
FIG. 7 is a perspective view of an alternative blowoff disc of the piston assembly.

With reference to FIGS. 6-7, the blowoff discs 124 can be circular plates. The blowoff discs 124 can have diameters slightly less than the diameter of the outer circumferential surface 148 of the body 116, thereby permitting fluid in the space between the blowoff disc 124 and the base surface 164 to flow around the blowoff disc to the respective subchamber 144, 146. The blowoff discs 124 can have a constant axial thickness. Each blowoff disc 124 includes the respective throughhole 126. The throughhole 126 may have a circular shape and may be centered in the blowoff disc 124. The throughhole 126 can have a diameter approximately equal to the diameter of the piston rod 114 (and the diameter of the inner bore 118) such that fluid is blocked from flowing between the throughhole 126 and the piston rod 114. The throughhole 126 is aligned with the inner bore 118, e.g., the throughhole 126 and the inner bore 118 are centered on the axis A.

The blowoff discs 124 decrease a resistance to movement in response to fluid flow past the blowoff disc 124 and/or a difference in fluid pressure on one side of the blowoff disc 124 relative to an opposite side. The fluid flow and/or difference in fluid pressure may translate or flex the blowoff disc 124 to create, and/or increase a size of, an axial gap 178 through which fluid may flow. Increasing the size of the axial gap 178 decreases resistance to movement by permitting a greater amount of fluid to flow from one subchamber 144, 146 to the other subchamber 144, 146. The amount of flex and/or translation of the blowoff discs 124 and the resulting increase in size of the axial gap 178 may be proportional to a rate of fluid flow and/or the pressure difference between the compression subchamber 144 and the rebound subchamber 146. For example, the greater the rate of fluid flow and/or difference in fluid pressure, the greater the amount of flex and/or translation of the blowoff discs 124 away from the body 116, providing a greater magnitude of increase of the size the axial gap 178 therebetween. A threshold rate of fluid flow and/or difference in fluid pressure may be required to flex and/or translate the blowoff disc 124. The blowoff discs 124 may not decrease resistance to movement until the threshold rate of fluid flow and/or difference in fluid pressure is achieved.

Each blowoff disc 124 includes at least one notch 132, e.g., a plurality of notches 132, extending from the throughhole 126. The notches 132 extend through the blowoff disc 124 and thereby permit fluid to pass across the blowoff disc 124. The notches 132 can be circumferentially spaced from each other, allowing shorter paths for fluid to travel from one of the grooves 128 to one of the notches 132. The notches 132 can extend radially outward from the throughhole 126, e.g., radially outward past an outer diameter of the center axial projection 166. Fluid from the lip 162 of the body 116 can thereby pass into the notch 132 and travel outside the center axial projection 166 to the space between the base surface 164 and the blowoff disc 124. The notches 132 are continuously open, i.e., regardless of the positions of other components of the damper assembly 102, and flow is restricted by cross-sectional areas of the notches 132. The cross-sectional area of one of the notches 132 is the area within the notch 132 and radially outside a diameter of the throughhole 126 in a plane perpendicular to the axis A. During design, the cross-sectional areas of the notches 132 can be used to tune the flow rate of fluid across the piston assembly 110, even if the grooves 128 remain the same, so the same body 116 can be used in damper assemblies 102 having different flow rates.

Each blowoff disc 124 includes at least one cutout 180. The cutouts 180 extend through the blowoff disc 124. The cutouts 180 may be spaced from each other. For example, the cutouts 180 of each blowoff disc 124 may be circumferentially spaced from each other and radially overlap, as shown in FIG. 6, i.e., be located at different circumferential ranges and at overlapping ranges of radiuses. For another example, the cutouts 180 of each blowoff disc 124 may circumferentially overlap, i.e., two or more cutouts 180 may be along a common radius extending from the axis A, as shown in FIG. 7. Such cutouts 180 may be spaced from each other along the common radius. The cutouts 180 may be positioned radially outside the center axial projection 166 and radially inside the peripheral axial projections 168. The cutouts 180 may be radially and circumferentially positioned above the base surface 164 of the respective side 158, 160 of the body 116, i.e., aligned along the axis A with the base surface 164. The cutouts 180 may decrease a stiffness of the respective blowoff disc 124. The positioning of the cutouts 180 help control the stiffness of the blowoff disc 124 to permit the blowoff disc 124 to deflect away from the peripheral axial projections 168, as described below.

The blowoff discs 124 at each side 158, 160 of the body 116 may be spaced from the base surface 164 on that side 158, 160, e.g., spaced from the base surface 164 at the throughbores 172 and/or at the ends of the projection passages 170 terminating at the base surface 164. Spacing the blowoff disc 124 from the base surface 164 at the throughbores 172 permits fluid to freely flow into and out of the throughbores 172, e.g., without inhibition of such flow by the blowoff disc 124. Spacing the blowoff disc 124 from one end of the projection passages 170 permits fluid to freely flow into the projection passage 170 on that side of the body 116, e.g., without inhibition of such flow by the blowoff disc 124.

The blowoff discs 124 at each side 158, 160 of the body 116 selectively permit fluid flow out of the projection passages 170 at the ends of the projection passages 170 terminating at the peripheral axial projections 168, i.e., depending on an amount and direction of fluid pressure applied to the blowoff disc 124. The blowoff disc 124 selectively permits fluid flow by controlling the size of the axial gap 178 between the blowoff disc 124 and the peripheral axial projections 168 at which the projection passages 170 terminate. Thus, the same component performs the distinct tasks of permitting fluid flow through the notches 132 and selectively permitting fluid to flow through the projection passages 170, reducing the number of components in the damper assembly 102.

When the damper assembly 102 is in a neutral state, i.e., not moving toward the extended position or the compressed position, the blowoff discs 124 on each side 158, 160 of the body 116 cover one end of the projection passages 170 and restricts or inhibits fluid flow into, and out of, the projection passages 170. Fluid may still flow through the indentations 174 if present, at a reduced rate compared to the blowoff disc 124 being flexed away from the respective peripheral axial projection 168. The blowoff disc 124 in the neutral state may abut the peripheral axial projections 168, e.g., surrounding an open end of the projection passage 170.

When the damper assembly 102 is moved toward the compressed or extended position, the blowoff disc 124 facing opposite the direction of movement of the body 116 may be moved away from the body 116, e.g., from the peripheral axial projections 168, by the pressure differential and/or fluid flow resulting from such movement. Moving the blowoff disc 124 away from the body 116 creates the axial gap 178 between the peripheral axial projection 168 of the body 116 and the blowoff disc 124. Fluid may flow out of the projection passages 170 through the axial gap 178 to the respective subchamber 144, 146.

When the damper assembly 102 is moved toward the compressed or extended position, the blowoff disc 124 facing in the direction of movement of the body 116 may be urged toward the body 116, not creating or enlarging the axial gap 178 between the peripheral axial projection 168 of the body 116 and the blowoff disc 124.

Figure 8:
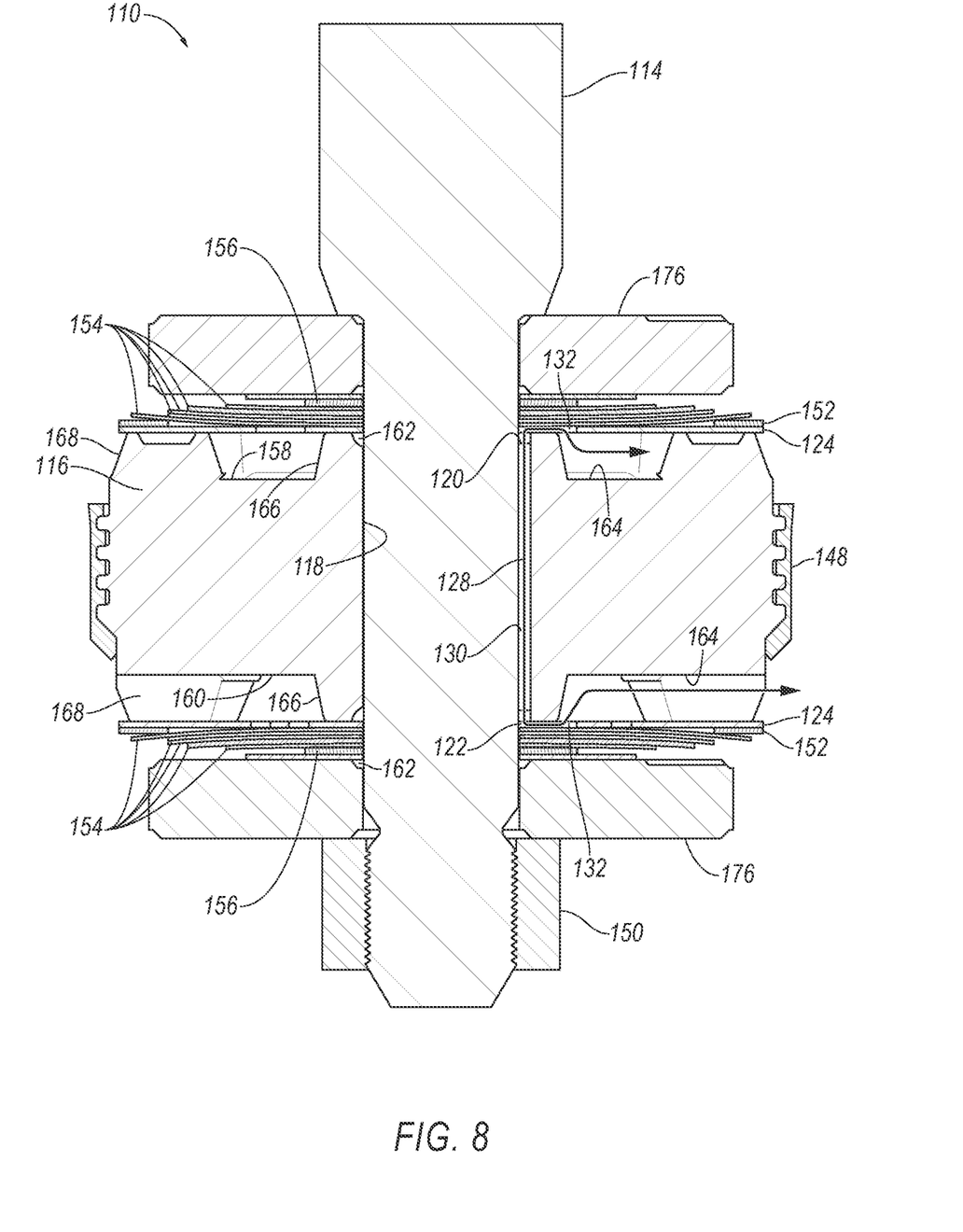
FIG. 8 is a cross-sectional view of the piston assembly.

With reference to FIG. 8, the damper assembly 102 may include one or more valve discs 154, e.g., one or more valve discs 154 on each side 158, 160 of the body 116. On each side 158, 160 of the body 116, the valve discs 154 may be stacked on the respective blowoff disc 124 such that the blowoff disc 124 is axially between the valve discs 154 and the body 116. The valve discs 154 may be supported by the piston rod 114. For example, the piston rod 114 may extend through center openings of the valve discs 154.

The valve discs 154 are elastically deformable. For example, force applied to an outer edge of the valve discs 154 may cause the valve discs 154 to flex such that the outer edge is moved axially relative the respective center opening of the valve discs 154. The valve discs 154 are made from an elastically deformable material, e.g., spring steel, plastic having suitable elastic properties, etc.

The valve discs 154 on each side 158, 160 of the body 116 urge the blowoff disc 124 on that side 158, 160 toward the body 116, i.e., the valve discs 154 increase an amount of force required to flex that blowoff disc 124 away from the respective peripheral axial projections 168.

The valve discs 154 may progressively decrease in size as a function of the distance from the body 116 along the axis A (or alternatively, decrease and then increase). For example, the valve disc 154 closest to the body 116 may have a larger outer diameter than an outer diameter of the valve disc 154 adjacent such valve disc 154, and so on. The valve disc 154 farthest from the body 116 may have a diameter smaller than the diameters of the other valve discs 154 on that side 158, 160 of the body 116. As another example, the valve discs 154 may be configured similar to a leaf spring.

The valve discs 154 closest to the body 116 may abut the respective blowoff discs 124 proximate the piston rod 114. The valve discs 154 closest the body 116 may be spaced from the blowoff discs 124 at radially outer edges of the blowoff discs 124. For example, the preload ring 152 on each side 158, 160 of the body 116 may be positioned axially between the valve discs 154, e.g., the closest valve disc 154, and the blowoff disc 124 on that side 158, 160 of the body 116 along the axis A. The preload rings 152 may be circular or any suitable shape. An inner diameter of the preload rings 152 may be smaller than an outer diameter of the closest valve disc 154 and smaller than an outer diameter of the respective blowoff disc 124. An outer diameter of the preload ring 152 may be at least as great as an outer diameter of the closest valve disc 154. The preload rings 152 may be radially outward of the cutouts 180 of the blowoff discs 124. The preload rings 152 may be metal, plastic, or any suitable material. The preload rings 152 provide internal preload forces to the valve discs 154.

Each damper assembly 102 may include a pair of the fulcrum discs 156. The fulcrum discs 156 provide fulcrum points for the valve discs 154. For example, one of the fulcrum discs 156 may abut the valve discs 154 such that the valve discs 154 on that side 158, 160 of the body 116 are axially between the fulcrum disc 156 and the body 116, e.g., may abut the smallest valve disc 154 on each side 158, 160 of the body 116 opposite the adjacent larger valve disc 154. An outer diameter of such fulcrum disc 156 may be smaller than an outer diameter of the abutting smallest valve disc 154, i.e., than any of the outer diameters of the valve discs 154 on that side 158, 160 of the body 116.

Each damper assembly 102 may include a pair of preload spacers 176. The preload spacers 176 protect the valve discs 154. The preload spacers 176 sandwich the body 116, the discs, and other components of the damper assembly 102 supported by the piston rod 114. A thickness of the preload spacers 176 may increase or decrease space available for the discs, the piston, etc. For example, the preload spacer 176 on each side 158, 160 of the body 116 may be axially outside of the fulcrum disc 156 on that side 158, 160 of the body 116. The fastener 150 may be fixed to the piston rod 114 axially outside of the preload spacer 176 on that side 158, 160 of the body 116. The fastener 150 may be, for example, a threaded lock nut. The fastener 150 may confine the preload spacers 176, the blowoff discs 124, the valve discs 154, the body 116, etc., to a stack having a predetermined length.

Figure 9:
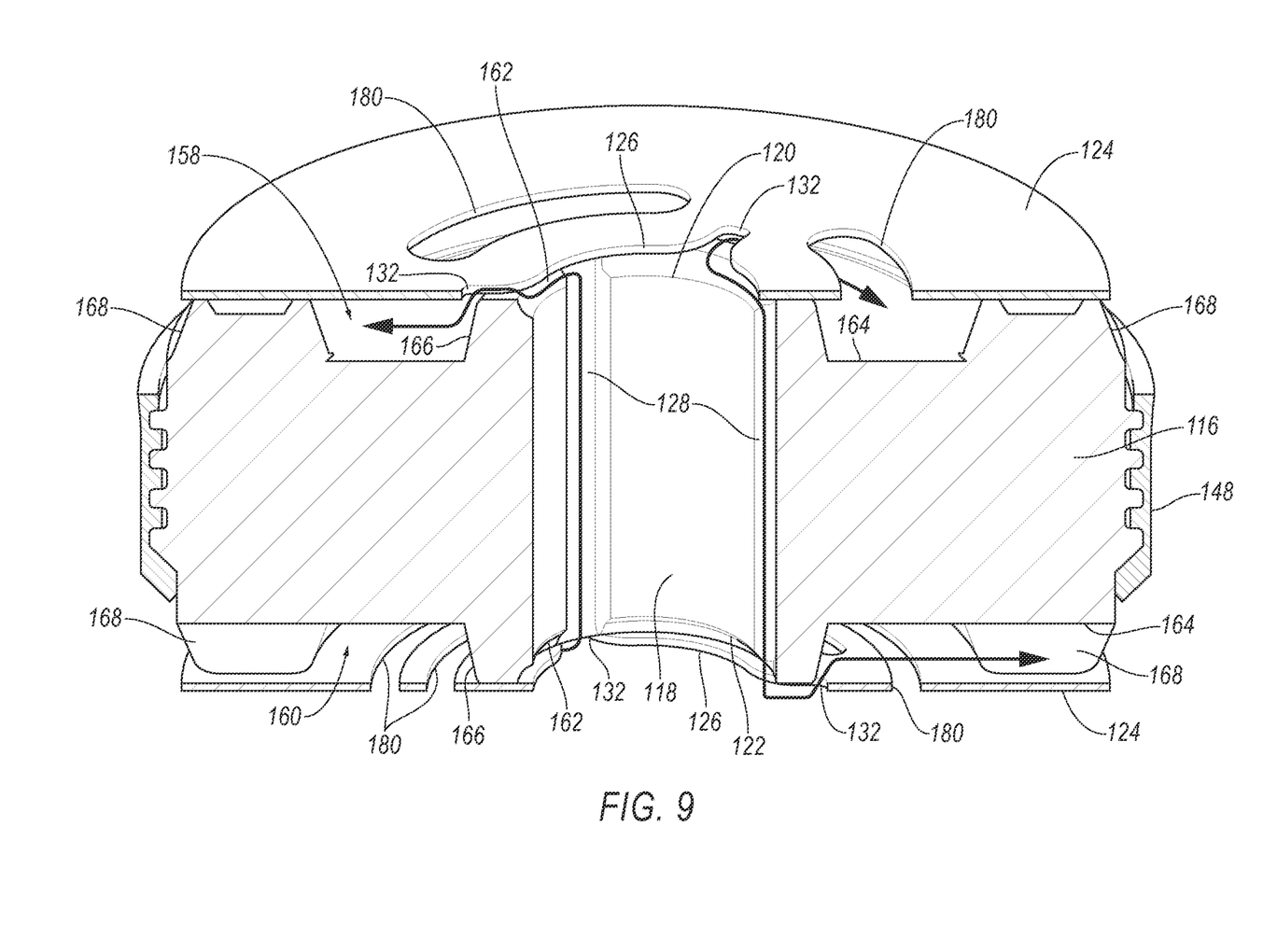
FIG. 9 is a perspective cross-sectional view of the body and blowoff disc of the piston assembly.

With reference to FIG. 9, when the piston assembly 110 moves toward the compressed or extended position, the passageways 130 defined by the grooves 128 and the piston rod 114 provide a flow path for fluid to move between the compression subchamber 144 and the rebound subchamber 146. For example, fluid located in the space between the blowoff disc 124 and the base surface 164 of the body 116 on one side 158, 160 of the body 116 travels through the notch 132 to cross from radially outside the center axial projection 166 to the lip 162 radially inside the center axial projection 166, then travels circumferentially around the piston rod 114 through the lip 162 to one of the grooves 128, then travels axially along that groove 128 to the lip 162 on the opposite side 158, 160 of the body 116, then circumferentially along that lip 162 to one of the notches 132 on that side 158, 160 of the body 116, and then radially outward through that notch 132 to the space between the other blowoff disc 124 and the base surface 164 on that side 158, 160 of the body 116. The space between the blowoff disc 124 and the base surface 164 on each side 158, 160 of the body 116 is in fluid communication with the respective subchamber 144, 146 around the outer diameter of the blowoff disc 124.

Figure 10:
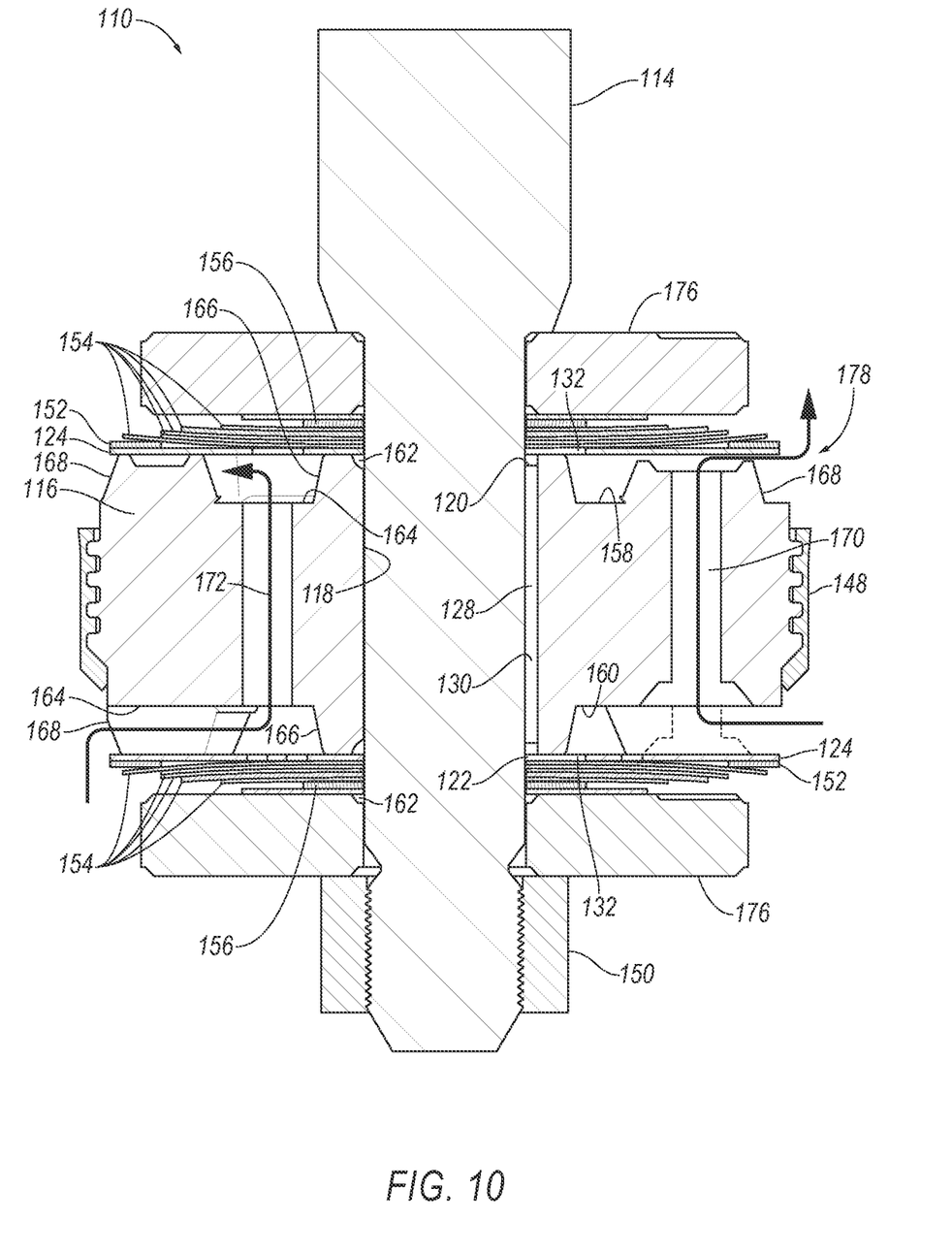
FIG. 10 is another cross-sectional view of the piston assembly.

With reference to FIG. 10, when the piston assembly 110 moves toward the compressed or extended position, the throughbores 172 provide a flow path for fluid to move between the compression subchamber 144 and the rebound subchamber 146. For example, fluid located in the space between the blowoff disc 124 and the base surface 164 of the body 116 on one side 158, 160 of the body 116 travels through the throughbores 172 to the space between the other base surface 164 and the other blowoff disc 124.

When the piston assembly 110 moves toward the compressed or extended position, the projection passages 170 provide a flow path for fluid to move between the compression subchamber 144 and the rebound subchamber 146. For example, fluid located in the space between the blowoff disc 124 and the base surface 164 of the body 116 on one side 158, 160 of the body 116 travels through the projection passages 170 having ends located at that base surface 164. If the difference in fluid pressure between the subchambers 144, 146 is greater than the threshold difference of the blowoff disc 124, the opposite blowoff disc 124 flexes away from the peripheral axial projections 168 on the opposite side 158, 160 of the body 116. The fluid in the projection passages 170 then travels out of the projection passages 170 into the opposite subchamber 144, 146. If the peripheral axial projections 168 include the indentations 174, then fluid can exit the projection passages 170 through the indentations 174 even if the difference in pressures is below the threshold.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A damper assembly comprising:
a pressure tube forming a chamber and defining an axis;
a piston assembly disposed in the chamber and dividing the chamber into two subchambers; and
a piston rod elongated along the axis and fixed to the piston assembly;
the piston assembly including a body having an inner bore extending axially through the body from a first end to a second end;
the piston assembly including a blowoff disc contacting the body at the first end of the inner bore and having a throughhole aligned with the inner bore;
the piston rod extending through and concentrically contacting the inner bore and extending through and concentrically contacting the throughhole;
one of the body or the piston rod having a groove extending axially along the inner bore from the first end to the second end;
the body and the piston rod forming a passageway through the groove permitting fluid to travel between the first end and the second end;
the blowoff disc having a notch extending from the throughhole and arranged to permit fluid from the passageway to pass across the blowoff disc;
the body having a first side facing axially toward the blowoff disc;
the first side including a center axial projection extending concentrically around the inner bore and contacting the blowoff disc; and
the notch extending radially outward past an outer diameter of the center axial projection.

2. The damper assembly of claim 1, wherein the body includes a lip at the first end of the inner bore permitting fluid to travel between the passageway and the notch.

3. The damper assembly of claim 2, wherein the lip extends completely around the first end of the inner bore.

4. The damper assembly of claim 1, wherein the body has a plurality of grooves including the groove, the grooves extend axially along the inner bore from the first end to the second end, and the grooves are circumferentially spaced from each other.

5. The damper assembly of claim 1, wherein the blowoff disc has a plurality of notches including the notch, the notches extend from the throughhole, and the notches are circumferentially spaced from each other.

6. The damper assembly of claim 1, wherein the body includes a throughbore extending through the body and permitting fluid to flow between the subchambers, and the throughbore is spaced from the inner bore.

7. The damper assembly of claim 6, wherein a cross-sectional area of the throughbore is greater than a cross-sectional area of the notch.

8. The damper assembly of claim 6, wherein the body includes a plurality of throughbores including the throughbore, the throughbores each permit fluid to flow between the subchambers, the throughbores are spaced from the inner bore, and the throughbores are spaced from each other.

9. The damper assembly of claim 1, further comprising a plurality of valve discs stacked on the blowoff disc such that the blowoff disc is axially between the valve discs and the body.

10. The damper assembly of claim 9, further comprising a fulcrum disc abutting the valve discs such that the valve discs are axially between the fulcrum disc and the body.

11. The damper assembly of claim 10, wherein an outer diameter of the fulcrum disc is smaller than any of the outer diameters of the valve discs.

12. The damper assembly of claim 10, wherein the piston rod extends through the valve discs and the fulcrum disc.

13. The damper assembly of claim 9, further comprising a preload ring positioned axially between the valve discs and the blowoff disc.

14. The damper assembly of claim 13, wherein an inner diameter of the preload ring is smaller than an outer diameter of a closest disc of the valve discs, and the inner diameter of the preload ring is smaller than an outer diameter of the blowoff disc.

15. The damper assembly of claim 13, wherein an outer diameter of the preload ring is at least as great as an outer diameter of a closest disc of the valve discs.

16. The damper assembly of claim 1, wherein the pressure tube is cylindrical.

17. The damper assembly of claim 1, wherein the first side includes a plurality of peripheral axial projections radially spaced from the center axial projection, and the peripheral axial projections contact the blowoff disc.

18. The damper assembly of claim 17, wherein the blowoff disc includes a cutout positioned radially outside the center axial projection and radially inside the peripheral axial projections.

* * * * *